J. C. BARBER.
CAR TRUCK.
APPLICATION FILED APR. 15, 1911.
1,014,362.
Patented Jan. 9, 1912.
3 SHEETS—SHEET 1.
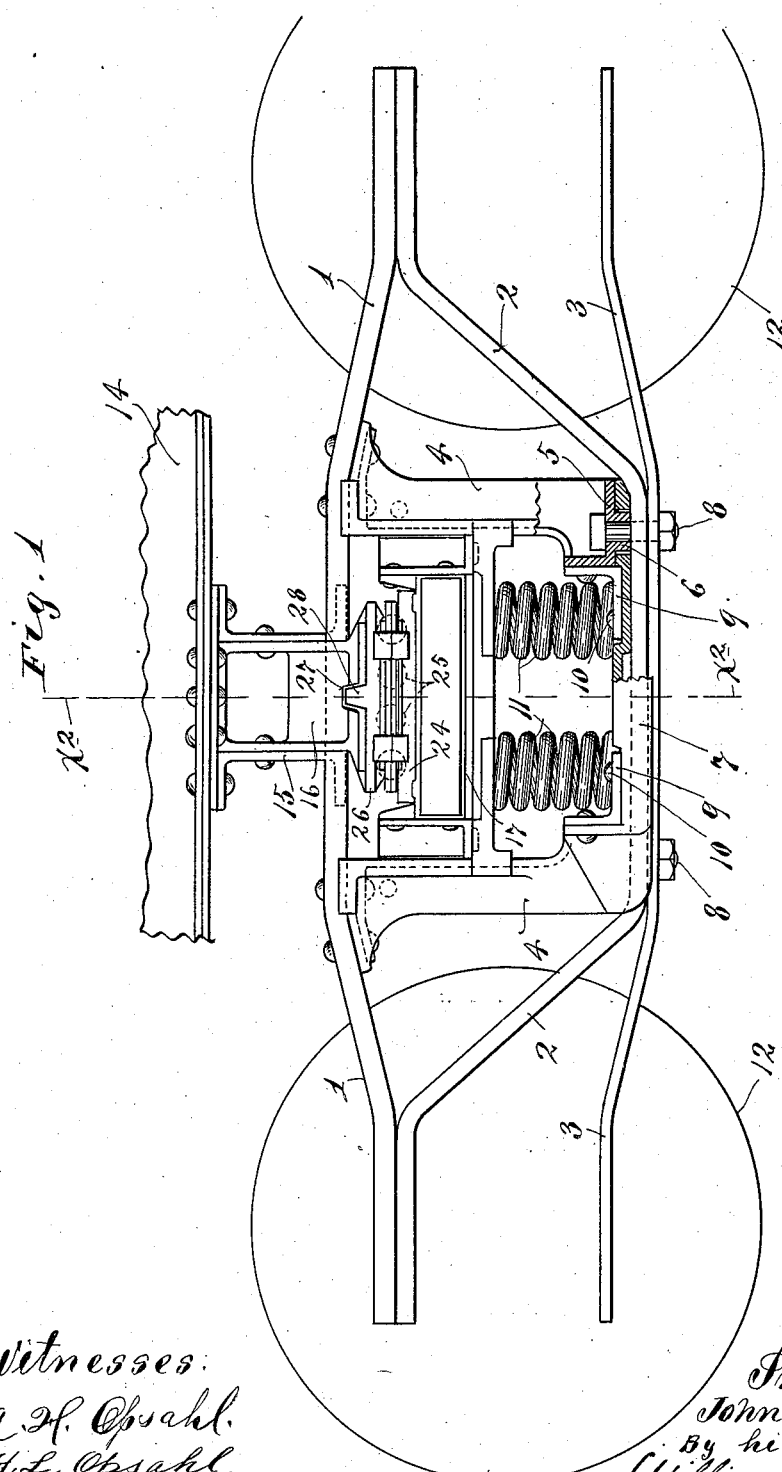

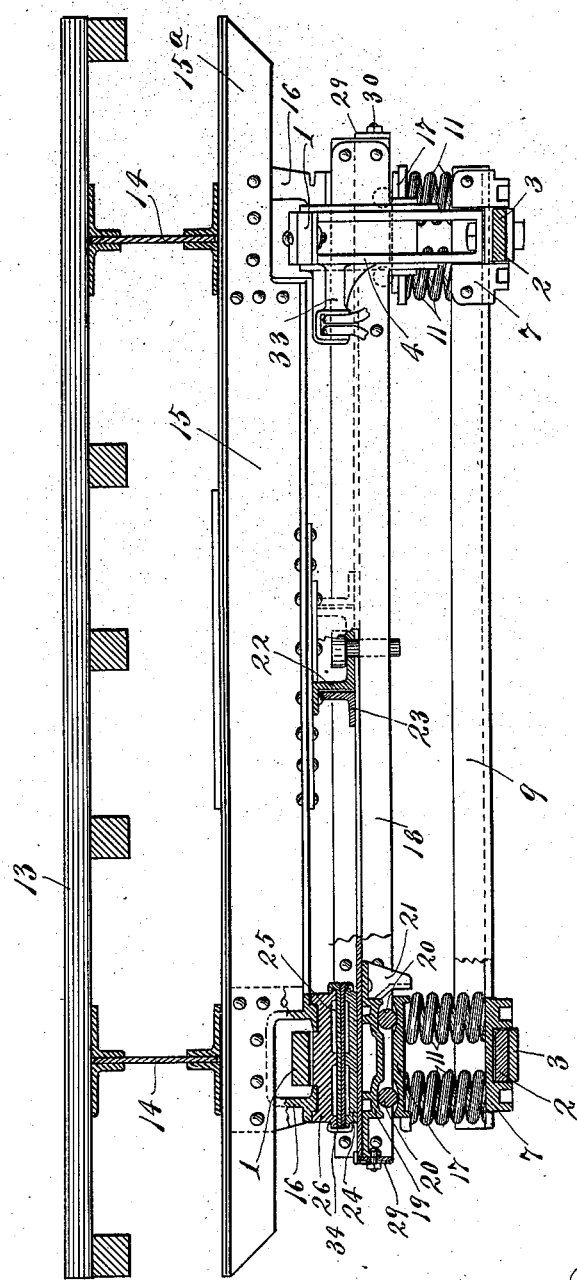

J. C. BARBER.
CAR TRUCK.
APPLICATION FILED APR. 15, 1911.
1,014,362.
Patented Jan. 9, 1912.
3 SHEETS—SHEET 3.
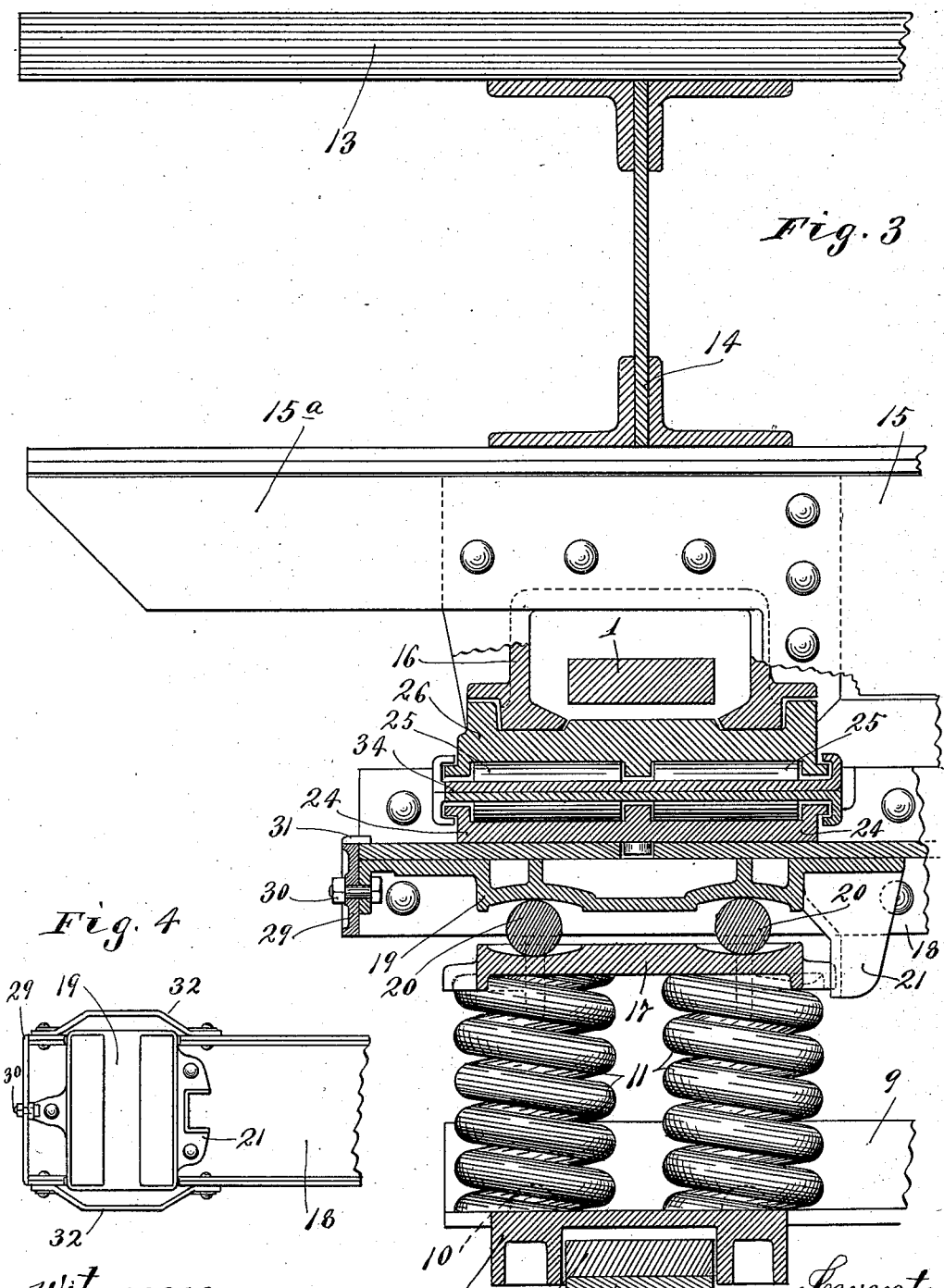

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

1,014,362.  Specification of Letters Patent.  Patented Jan. 9, 1912.

Application filed April 15, 1911. Serial No. 621,238.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to car trucks of the general type disclosed in my numerous prior patents wherein provision is made for limited lateral motion of the car body in respect to the supporting trucks in addition to the customary swiveling or radial motion, and especially wherein both the lateral and radial motions are taken on anti-friction bearing rollers.

More specifically stated, the present invention is directed to the improvement of the general arrangement of the lateral motion and radial motion devices disclosed and claimed in the patent to Lake and Deverell, 798,350, of date August 29, 1905, and in my prior Patents 863,012 of date August 13, 1907, and 875,565 of date December 31, 1907.

The present invention is directed to an improvement on or modification of the several constructions disclosed and claimed in the said patents above identified and the invention, generally stated, consists of the novel devices and combinations of devices hereinafter described and defined in the claims.

In the accompanying drawings, which illustrate the improved truck, like characters indicate like parts throughout the several views.

Referring to the drawings, Figure 1 is a view in side elevation, with some parts broken away, with some parts sectioned and with some parts shown in diagram, some parts being entirely removed, showing one of the car trucks and a portion of a car body; Fig. 2 is a transverse section taken on an irregular line which is partly on the line $x^2$ $x^2$ of Fig. 1, but which is offset to show certain parts in full; Fig. 3 is an enlarged section also taken on the line $x^2$ $x^2$ of Fig. 1; and Fig. 4 is a detail view in plan, with some parts broken away, showing the truck bolster removed from the truck.

So far as the broad features of the invention are concerned, the side frames of the truck may be either cast or of the arch bar type, but, as shown, it is of the latter type and comprises a top arch bar 1, a bottom arch bar 2 and a bottom tie bar 3, which parts at their ends are secured in the customary or any suitable way, to journal boxes, not shown. The bolster columns 4 are cast structures interposed between the intermediate portion of the arch bars 1 and 2. The flanged upper ends of these bolster columns are shown as riveted to the top arch bar 1 and at their lower ends they are shown as provided with angular bases 5 having depending sleeves 6. The bases 5 rest upon the end portions of inverted channel-shaped saddle plates 7 and their sleeves 6 are mounted in seats formed in the said saddle plates. The depending flanges of the saddle plates 7 embrace the intermediate lower portions of the bars 2 and 3, and in lieu of long column bolts, short nutted bolts 8 are passed through the bases 5 and their sleeves 6 and through perforations in the said bars 2 and 3. The heads of the bolts 8 are preferably seated on top of the column bases 5 and the said columns immediately above the same are cut away, so that the said bolts, when their nuts are removed, may be easily lifted out of working positions or applied in working positions.

Cross ties or transoms 9, preferably in the form of angle bars, are seated on the saddle plates 7 and are riveted thereto and to the upturned flanges of the column bases 5. The rivets 10 which connect the lower flanges of the transoms 9 to the saddle plates 7, serve to hold positioned coiled bolster supporting springs 11.

The truck wheels 12 are diagrammatically shown only in Fig. 1. It will, of course, be understood that their axles may be journaled in the journal boxes in the customary way.

The car body or platform 13, in accordance with my invention disclosed and broadly claimed in my co-pending application S. N. 619,216, filed of date April the 6th, 1911, and entitled "Car construction," is provided with longitudinally extended side sills 14 that are located directly over the truck side frames. These side sills 14, as shown, are I-beam structures made up of vertical plates and reversely arranged pair of angle bars, but this has nothing to do with the present invention, but is a feature specifically claimed in my co-pending application S. N. 621,239, filed of date April the 15th, 1911, and entitled "Underframe structure for cars."

The car body bolsters 15 which, as shown, are formed by heavy metal channel beams, have end portions 15ª of reduced vertical dimensions that are extended directly under and are rigidly secured to the end portions of the side sills 14. Bearing brackets 16 are riveted or otherwise rigidly secured both to the body bolsters 15 and to the lower flanges of the side sills 14. These bearing brackets 16 are provided with depending legs that straddle or embrace the upper arch bars 1 with sufficient clearance to permit the required lateral motion of the car body in respect to the truck or as will hereinafter more clearly appear.

The bolster supporting springs 11, as shown, are arranged in groups of four and they directly support combined spring caps and roller bases 17 that are guided for vertical movements, but are held against horizontal movements, by the parallel inner faces of the bolster columns 4. The truck bolster 18, which as shown and preferred is in the form of metal I-beam, is extended between the bolster columns 4 and has riveted or otherwise rigidly secured to the under surface of its horizontal web and between its depending flanges, a roller cap 19 between which and the coöperating combined spring caps and roller bases 17, lateral motion bearing rollers 20 are interposed. The said rollers 20 engage directly with concave seats formed in the said elements 17 and 19, said seats being so arranged that the weight of the load tends to hold the truck bolster 18 and parts carried thereon in intermediate or center positions. At their inner extremities, the roller caps 19 are shown as provided with depending stop lugs 21 that engage with the inner edges of the combined spring caps and roller bases 17 and limit the endwise movements of the truck bolster transversely of the truck. The elements 17, 19 and 20 constitute the anti-friction lateral motion devices of the truck.

At their central portions, the body bolster 15 and truck bolster 18 are pivotally connected, as shown, by a depending hub 22 on the former and by a coöperating flange bearing collar 23 on the latter. No part of the weight of the load is carried by or transmitted through the said elements 22 and 23.

Secured on the upper surface of the web of the truck bolster 18 directly above the roller caps 19 are roller bases 24 upon which are seated bearing rollers 25. A roller cap 26 is supported upon the rollers 25 and the lower ends or feet of the depending legs of the so-called bearing brackets 16 are seated in depressions formed in the said roller caps and, in turn, are provided with notches 27 that receive upward projections 28 of the said roller caps. In this way, the roller caps 26 are normally locked to the legs of the bearing brackets 16, so that they must move therewith under radial or pivotal movements of the truck in respect to the car body. The said elements 24, 25 and 26 constitute the side bearings or radial motion anti-friction devices of the truck and, hence, the rollers 25 will extend longitudinally of the truck bolster 18, or, preferably, in a direction radiating from the axis of the pivotal connection 22—23.

The numeral 29 indicates small bolster end caps which, as shown, are secured to depending flanges of the roller caps 19, by short nutted bolts 30, and are provided with lips 31 that overlap the ends of the horizontal web of the said bolster.

The truck bolster 15 moves transversely of the truck and, hence, moves endwise through the truck side frames. It is of less width than the distance between the coöperating bolster columns 4 and is provided with chafing plates 32, best shown in Fig. 4, by reference to which it will be seen that the intermediate portions of the chafing plates are offset from the side of the bolster and that their ends are bent inward and riveted to the flanges of the said bolster. Also, as shown, the bolster columns 4 are provided with projecting brake hanger arms 33 shown only at the right in Fig. 2.

In the drawings, the radial motion of the side bearing rollers 25 are shown as held properly spaced by a cage or roller spacing device indicated as an entirety by the numeral 34. This roller spacing device, however, forms no part of the present invention, but is disclosed and claimed in my co-pending application S. N. 621,240, filed April the 15th, 1911, and entitled "Roller bearing."

From the foregoing description and especially the drawings, the following facts are made evident:—That the truck bolster moves endwise with the body bolster transversely of the truck, or in other words, partakes of the lateral motion car body in respect to the truck, but is capable of radial or pivotal movement in respect thereto. That both the lateral motion and the radial motion roller bearing devices are located below the top arch bar of the side frames and are confined within the side frames, so that the body bolster may be dropped very low. This makes it practicable to place the body bolsters below the side sills of the car and, in doing so, does not raise the car platform or body too high. That the connection between the roller cap of the radial bearing device, and the body bolster or side sills or both, is made in a very simple and efficient manner without requiring any special construction of truck side frames. The car side frames may, as already indicated, be of any suitable form, either cast or structural iron or steel, in which a top arch bar or member of some form is employed, but this top arch bar or member may be made of normal width and dimensions since it is embraced by the legs of the bearing brackets 16.

What I claim is:

1. In a car truck, the combination with truck side frames having top compression members, of a truck bolster and a body bolster pivotally connected for radial movements and for simultaneous endwise movements transversely of the truck, anti-friction lateral motion bearings supporting said truck bolster from said truck side frames, and radial motion anti-friction side bearings located within said side frames below the top compression members thereof and supporting said body bolster from said truck bolster.

2. In a car truck, the combination with truck side frames having top arch bars, of a truck bolster and a body bolster pivotally connected for radial movements and for simultaneous endwise movements transversely of the truck anti-friction lateral motion bearings supporting said truck bolster from said truck side frames, radial motion anti-friction side bearings located within said side frames below the top arch bars thereof, laterally spaced bearing legs secured to said body bolster, straddling the said top arch bars with clearance and supporting said body bolster from said side bearings.

3. In a car truck, the combination with truck side frames, of a truck bolster and a body bolster pivotally connected for radial movements and for simultaneous endwise movements transversely of the truck, anti-friction lateral motion roller bearing devices spring supported from said side frames and supporting said truck bolster, and radial motion anti-friction roller side bearings located within said side frames below the top arch bars thereof and supporting said body bolster from said truck bolster.

4. In a car truck, the combination with truck side frames, of a body bolster connected to said truck for radial movements, anti-friction lateral motion and anti-friction radial motion bearing devices supporting said body bolster from said truck side frames, and a car body having main side sills resting on and secured to said body bolster and located directly above said truck side frames.

5. In a car truck, the combination with truck side frames, of a body bolster connected to said truck for radial movements, anti-friction lateral motion and anti-friction radial motion side bearings and coöperating supporting springs supporting said body bolster from said truck side frames, and a car body having main side sills resting on and secured to said body bolster and located directly above said truck side frames.

6. In a car truck, the combination with truck side frames having top arch bars, of a truck and a body bolster pivotally connected for radial movements and for simultaneous endwise movements transversely of the truck, anti-friction lateral motion roller bearings supporting said truck bolster from said side frames, radial motion roller side bearings supported on said truck bolster below the top arch bars of said side frames, and bearing brackets rigidly secured to said truck bolster and having depending legs embracing the top arch bar of said side frames with clearance and detachably seated on the said side bearings.

7. A truck bolster having chafing plates for engagement with the truck columns, formed by flat plates having their body portions offset from said bolster and having their end portions bent laterally and rigidly secured to the sides of the end portions of said bolster.

In testimony whereof I affix my signature in presence of two witnesses.

JOHN C. BARBER.

Witnesses:
LEE W. BARBER,
A. M. LOVE.